US011300950B2

(12) United States Patent
Dixon et al.

(10) Patent No.: US 11,300,950 B2
(45) Date of Patent: Apr. 12, 2022

(54) SYSTEMS AND METHODS FOR AUTOMATIC CONFIGURATION OF INTELLIGENT ELECTRONIC DEVICES

(71) Applicant: ROCKWELL AUTOMATION TECHNOLOGIES, INC., Mayfield Heights, OH (US)

(72) Inventors: Elmorris P. Dixon, Willoughby Hills, OH (US); David C. Mazur, Mequon, WI (US); Philip Muren, North Royalton, OH (US); Douglas Francis McEldowney, Medina, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/780,524

(22) Filed: Feb. 3, 2020

(65) Prior Publication Data
US 2021/0240176 A1 Aug. 5, 2021

(51) Int. Cl.
*G05B 23/02* (2006.01)
*G05B 19/418* (2006.01)

(52) U.S. Cl.
CPC ..... *G05B 23/0216* (2013.01); *G05B 19/4183* (2013.01); *G05B 19/4185* (2013.01)

(58) Field of Classification Search
CPC ............ G05B 23/0216; G05B 19/4185; G05B 19/4183
See application file for complete search history.

(56) References Cited

U.S. PATENT DOCUMENTS

| 2002/0080811 | A1* | 6/2002 | Wetzel | G01D 21/00 370/442 |
| 2014/0280714 | A1 | 9/2014 | Dolezilek et al. | |
| 2015/0229516 | A1* | 8/2015 | Thanos | H04L 41/0809 370/254 |
| 2017/0097615 | A1* | 4/2017 | Mazur | H02J 13/00034 |

FOREIGN PATENT DOCUMENTS

| DE | 102017003529 A1 | 10/2017 | |
| WO | WO-2013020916 A2 * | 2/2013 | ............. H04L 69/26 |

OTHER PUBLICATIONS

Extended European Search Report for EP21152281.8 dated May 26, 2021, 10 pages.

* cited by examiner

*Primary Examiner* — Christopher E. Everett
(74) *Attorney, Agent, or Firm* — Fletcher Yoder P.C.

(57) ABSTRACT

A method includes receiving one or more data files that have one or more user-selected input parameters associated with one or more electrical devices in an industrial system, one or more output parameters associated with the electrical devices, one or more input/output parameter tags, a frequency or a condition associated with data transmission for each electrical device, or a combination thereof. The electrical devices may communicate via a first communication network based on the International Electrotechnical Commission 61850 standard, and the controller may communicate via a different communication network. The method also includes automatically programming the controller to control one or more operations of each electrical device based on the data files and transmitting the data files to a gateway device communicatively coupled to the controller along a backplane of a chassis system. The gateway device is automatically configured based on the one or more data files.

20 Claims, 5 Drawing Sheets

SYSTEMS AND METHODS FOR AUTOMATIC CONFIGURATION OF INTELLIGENT ELECTRONIC DEVICES

BACKGROUND

The present disclosure relates generally to automatically configuring a controller for use with one or more intelligent electronic devices (IEDs) in an industrial system. More specifically, the present disclosure relates to a configuration system that provides for automatic configuration of a controller for communication with one or more IEDs that utilize a different communications protocol network than the controller in an industrial system and for controlling one or more operations of the one or more IEDs.

Large industrial systems, such as process control systems, typically include hundreds or thousands of devices that may communicate using different communication protocols. For example, such devices may include intelligent motor control devices (e.g., a controller) as part of a process control system and intelligent electrical devices (IEDs) as part of an electrical power distribution and automation control system. In certain industrial systems, intelligent motor control devices may communicate data via a different communication protocol than the IEDs. As such, a controller in an industrial system that utilizes a particular communication protocol may not be configured to read data received from the IEDs that utilize a different communication protocol. Accordingly, it may be useful to provide systems and methods for automatically configuring a controller for use and communication with IEDs that utilize a different communication protocol to minimize manual programming and configuration of devices in an industrial system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system has a controller that may communicate via a first communication network in an industrial system and one or more electrical devices that may communicate via a second communication network in the industrial system. The system also has one or more processors and a memory, accessible by the processors, storing instructions, that when executed by the processors, cause the processors to generate a graphical user interface that includes a set of input/output (I/O) parameters associated with each electrical device in the industrial system for display by a computing device. The instructions also cause the processors to receive an indication of one or more user-selected I/O parameters of the set of I/O parameters associated with each electrical device and generate a first data file that has one or more input parameters that may be transmitted to the electrical devices from the controller, one or more output parameters that may transmitted to the controller from the electrical devices, one or more I/O parameter tags, or a combination thereof, based on the indication of the user-selected I/O parameters. Additionally, the instructions also cause the processors to generate a second data file that has the user-selected I/O parameters and a frequency or a condition associated with data transmission for each electrical device and transmit the first data file and the second data file to the controller. The controller is automatically configured to communicate with each electrical device based on at least the first data file after receiving the first data file and the second data file.

In another embodiment, a method includes receiving one or more data files that have one or more user-selected input parameters associated with one or more electrical devices in an industrial system, one or more output parameters associated with the electrical devices, one or more input/output parameter tags, a frequency or a condition associated with data transmission for each electrical device, or a combination thereof. The electrical devices may communicate via a first communication network based on the International Electrotechnical Commission 61850 standard, and the controller may communicate via a different communication network. The method also includes automatically programming the controller to control one or more operations of each electrical device based on the data files and transmitting the data files to a gateway device communicatively coupled to the controller along a backplane of a chassis system. The gateway device is automatically configured based on the one or more data files.

In another embodiment, a non-transitory, computer-readable medium has instructions that when executed by one or more processors, cause the processors to perform operations that include generating a graphical user interface that includes a set of input/output (I/O) parameters associated with one or more respective electrical devices in an industrial system for display by a computing device. The electrical devices may communicate via a first communication network based on the International Electrotechnical Commission (IEC) 61850 standard. The operations also include receiving an indication of one or more user-selected I/O parameters of the set of I/O parameters associated with the electrical devices and generating one or more data files that have one or more input parameters that may transmitted to the electrical devices from the controller, one or more output parameters that may transmitted to the controller from the electrical devices, one or more I/O parameter tags, a frequency or a condition associated with data transmission for each electrical device, or a combination thereof, based on the indication of the user-selected I/O parameters. The controller may communicate via a second communication network different from the first communication network. Additionally, the operations include transmitting the data files to the controller. The controller is automatically configured to control one or more operations of each electrical device based on the one or more data files.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present invention will become better understood when the following detailed description is read with reference to the accompanying drawings in which like characters represent like parts throughout the drawings, wherein.

Figure 4:
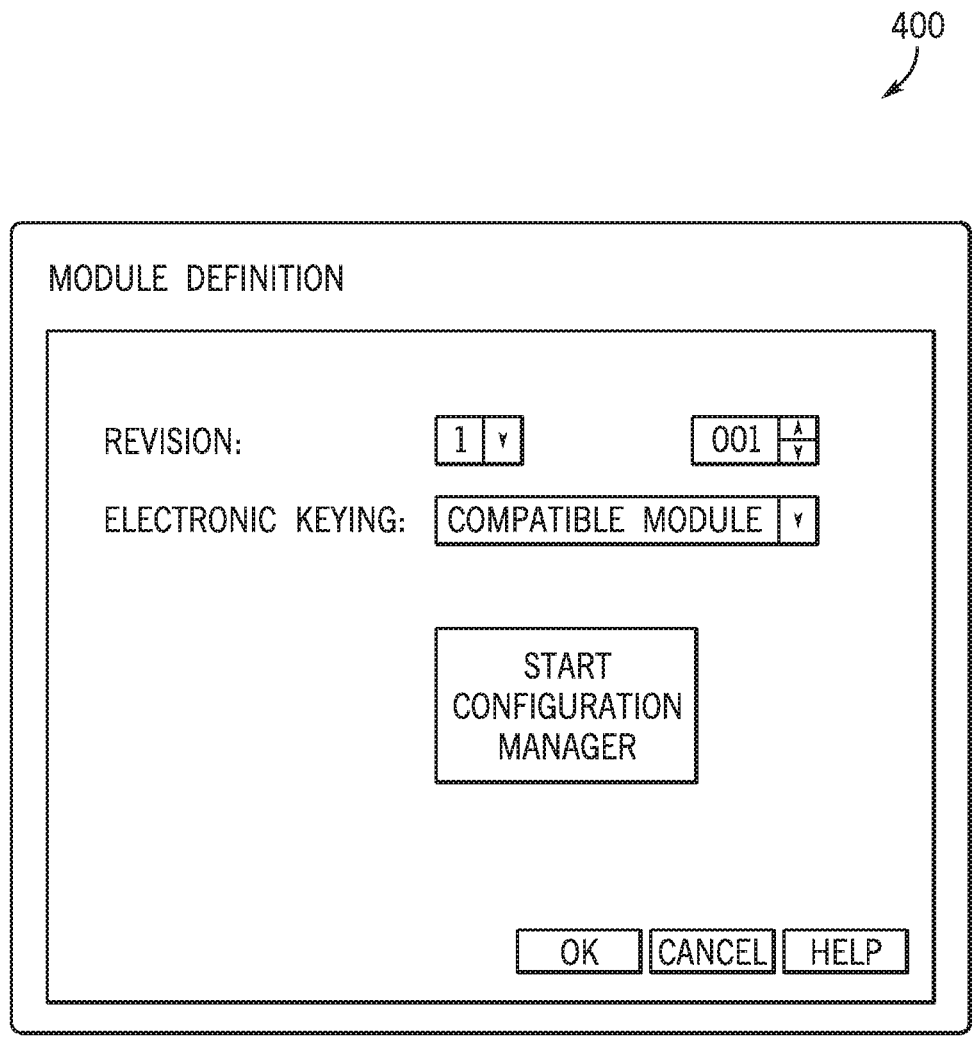
Figure 5:
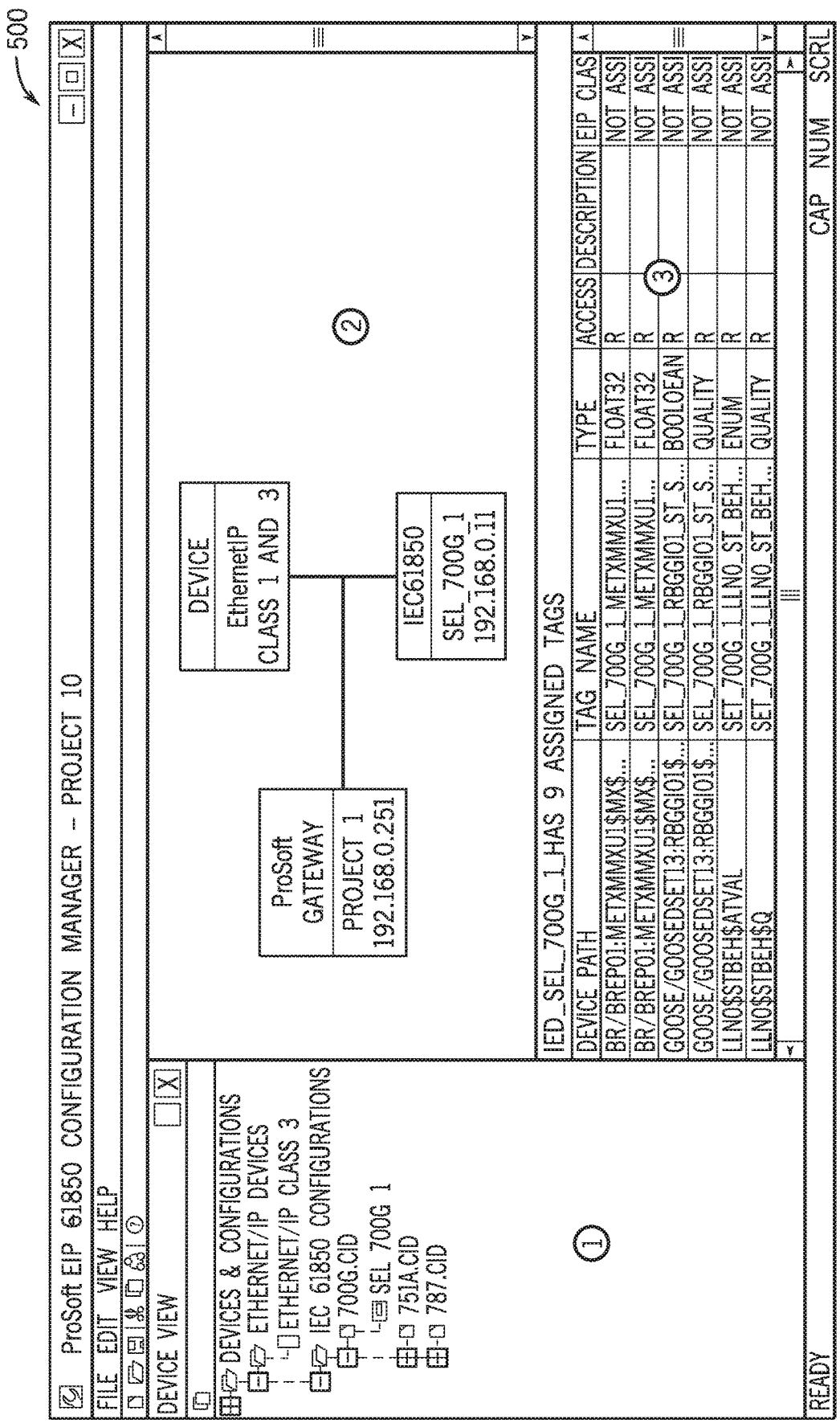

FIG. 4 illustrates an exemplary launch window of a graphical user interface that facilitates configuration of the controller for use and communication with the IEDs, in accordance with embodiments described herein; and FIG. 5 illustrates a configuration window of the graphical user interface that facilitates configuration of the controller for use and communication with the IEDs, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Large industrial systems, such as process control systems, typically include hundreds or thousands of devices that may communicate using different communication protocols. For example, such devices may include intelligent motor control devices (e.g., a controller) as part of a process control system and intelligent electrical devices (IEDs) (e.g., meter relays, motor relays, transformers, generators, circuit breakers, power monitors, switchgears, or the like) as part of an electrical power distribution and automation control system. Generally, motor control devices communicate data via a different communication protocol than the IEDs. For example, in certain industrial systems, the motor control devices may communicate via an EtherNet/IP network while the IEDs communicate via an unmodified Ethernet network based on the International Electrotechnical Commission (IEC) 61850 standard or the like. As such, a controller in such industrial systems may not be configured to read data received from the IEDs or write commands that the IEDs may process or receive because the IEDs utilize a different communication protocol. In such circumstances, a user may manually configure the controller to read the data received from each IED and write commands to each IED to perform one or more operations. However, this process may be arduous and time-consuming as the user typically has to manually write script instructions to individually pull input/output (I/O) parameter information from each IED on the IEC 61850 network, decode the received I/O parameter information to identify a set of I/O parameters associated with each IED, and map the set of I/O parameters associated with each IED in the controller.

Accordingly, embodiments of the present disclosure are generally directed to a configuration system that automatically configures a controller for communication with and to control one or more operations of one or more IEDs that utilize a different communication protocol than the controller in an industrial system. For example, the controller may communicate via an EtherNet/IP network while the IEDs communicate via an unmodified Ethernet network based on the International Electrotechnical Commission (IEC) 61850 standard. Additionally, the configuration system may also configure a gateway device to exchange I/O parameter data between the controller and the IEDs. For example, the gateway device may receive input parameter data for each IED (e.g., command instructions) from the controller via a first communication network (e.g., the EtherNet/IP network), transmit the input parameter data to a corresponding IED via a second communication network (e.g., the IEC 61850 network), receive output parameter data from the IEDs, and transmit the output parameter data to the controller. The gateway device may be communicatively coupled to the controller via a backplane of a chassis system.

In certain embodiments, the configuration system may generate a graphical user interface for display on a computing device accessible by a user that facilitates configuration of the controller for communication with one or more IEDs that utilize a different communications protocol network than the controller in an industrial system and for controlling one or more operations of the one or more IEDs via the gateway device. For example, the configuration system may access a database for information associated with each IED in the industrial system, such as an identifier of each IED, a type of each IED, a set of I/O parameters associated with each type of IED, or the like. The graphical user interface may provide the user with each set of I/O parameters associated with each IED in the industrial system. The user may then select a subset of each set of I/O parameters associated with each IED to read as outputs from each IED or write as inputs to each IED.

Based on the user-selected I/O parameters associated with each IED, the configuration system may generate a first data file (e.g., an extensible markup language (XML) file) that may define one or more types of I/O parameter data that may be exchanged between each IED and the controller via the gateway device. That is, the first data file is a controller configuration file used to create or modify I/O parameter tags in the controller based on one or more types of I/O parameter data in the controller configuration file. For example, the first data file may include one or more types of user-selected input parameters that may be transmitted to each IED, one or more types of user-selected output parameters that may be received from each IED, one or more I/O parameter tags to be stored in the controller that correspond to the user-selected I/O parameters, and one or more conditions that may initiate an I/O parameter data transmission between the gateway device and the controller. Additionally, the configuration system may generate a second data file (e.g., an XML file) that contains device mapping data defining how data is exchanged between the gateway device and each IED based on the user-selected I/O parameters. For example, the second data file may include a number of connections associated with the gateway device, an I/O parameter type associated with each connection (e.g., input or output), each type of user-selected I/O parameter transmitted between the gateway device and each IED, a frequency of parameter data transmission for each user-selected I/O parameter between each IED and the gateway device, or the like. The second data file may also define how the I/O parameter data received from each IED is mapped to each corresponding I/O parameter tag stored in the controller.

After generating the first data file and the second data file, the configuration system may then transmit the first data file and the second data file to the controller via the first communication network. Upon receiving the first data file, the controller may be automatically configured based on the first data file. For example, the controller may store the I/O parameter tags defined in the first data file in the controller.

The controller may also push the second data file to the gateway device. For example, a chassis may include the controller and the gateway device inserted into slots or receiving ports of the chassis. A backplane of the chassis may transmit data between each device coupled to the chassis. That is, the controller and the gateway device may be communicatively coupled via the backplane of a chassis. After a power cycle of the controller and the gateway device (i.e., the controller and the gateway device are restarted), the controller may transmit the second data file to the gateway device via the backplane of the chassis system. The gateway device may then be automatically configured based on the second data file. For example, the gateway device may associate one or more connections of the gateway device with a particular input parameter associated with an IED or a particular output parameter associated with an IED based on the device mapping data in the second data file. The gateway device may also set an update rate value for each connection of the gateway device based on the frequency of parameter data transmission for a corresponding user-selected I/O parameter defined in the second data file. The gateway device may then push the configuration of the gateway device to each IED utilizing the second communication network. As such, the configuration system may automatically configure the controller for communication with the IEDS and for controlling one or more operations of the one or more IEDs (e.g., via the gateway device) even though the IEDs utilize a different communications protocol than the controller in the industrial system. In this way, the configuration system may facilitate a reduction in the amount of programming a user manually performs to configure the controller for use and communication with IEDs utilizing a different communication protocol than the controller in the industrial system. Additional details regarding the configuration system, the controller, the gateway device, and the IEDs will be discussed below with reference to FIGS. 1-3.

Figure 1:
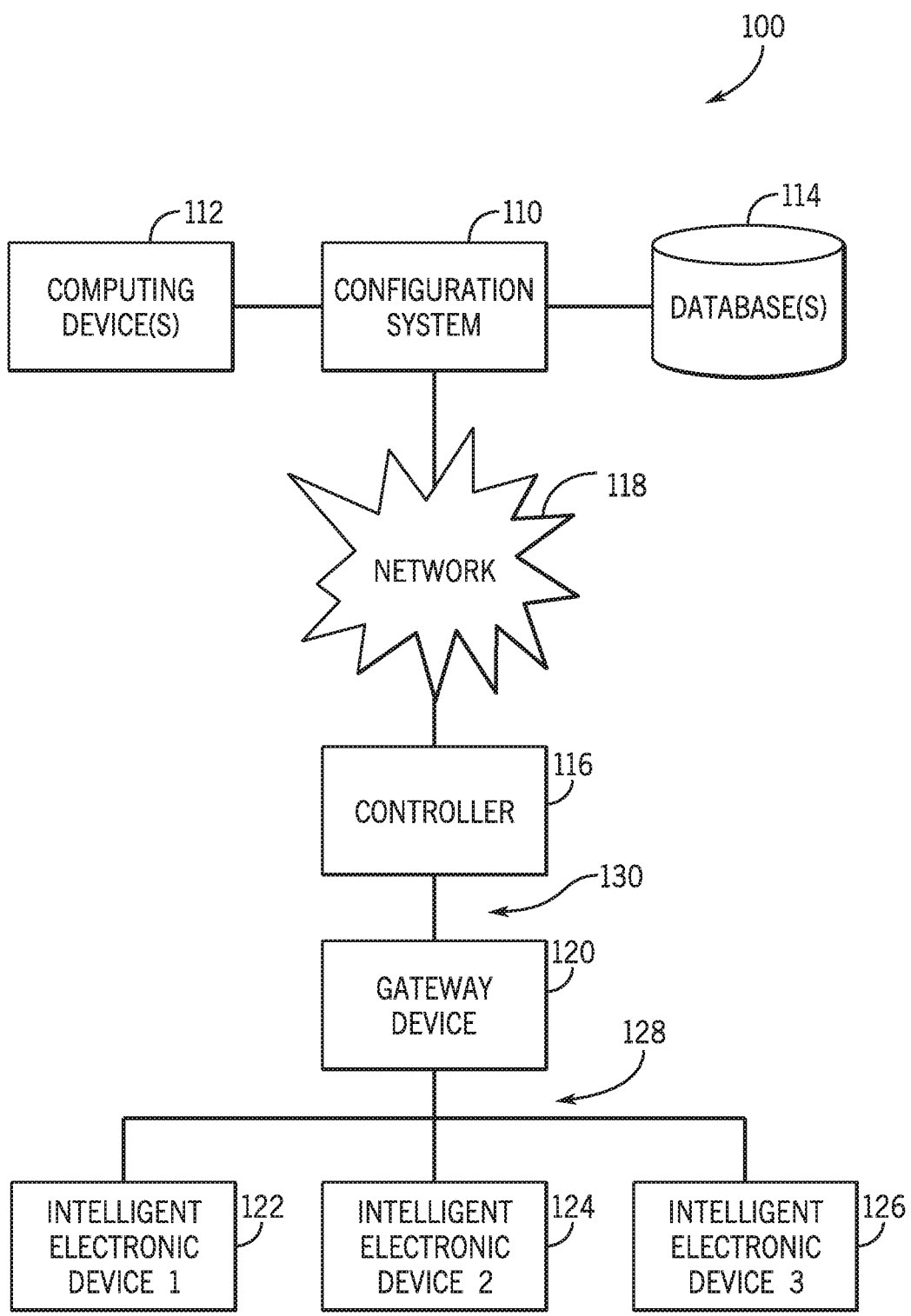
FIG. 1 illustrates a block diagram of an industrial communication system, in accordance with embodiments described herein.

By way of introduction, FIG. 1 illustrates a block diagram of an exemplary industrial communication system 100, in accordance with embodiments presented herein. The industrial communication system 100 may include a configuration system 110 that generates a graphical user interface for display on one or more computing device(s) 112 accessible by a user that facilitate configuration of a controller 116 for communication with one or more IEDs 122, 124, 126 that utilize a different communication protocol than the controller 116 in an industrial system and for controlling one or more operations of the IEDs 122, 124, 126. For example, the IEDs may include meter relays, motor relays, transformers, generators, circuit breakers, power monitors, switchgears, or the like. The controller 116 may be configured to read certain types of output parameter data from the IEDs and write certain types of input parameter data (e.g., command instructions) that the IEDs may understand to perform an operation associated with load shedding, load management, opening circuit breakers, closing circuit breakers, or the like. In certain embodiments, the controller 116 may communicate via a first communication protocol network 118 and the IEDs 122, 124, 126 may communicate via a second communication protocol network 128 different from the first communication network 118. For example, the first communication protocol network 118 may include any wired or wireless network that may be implemented as a local area network (LAN), a wide area network (WAN), and the like, or any industrial communication network protocol, such as EtherNet/IP, ControlNet, DeviceNet, and the like. In contrast, the second communication protocol network may include an unmodified Ethernet network based on the IEC 61850 standard.

To generate the graphical user interface for display by the computing device 112, the configuration system 110 may access a database 114 for information associated with each IED in the industrial system. For example, the information associated with each IED may include an identifier of each IED, a product type of each IED, a set of I/O parameters associated with each type of IED, or the like. It should be noted that the database 114 may be a proprietary database that exclusively communicates with the configuration system 110 or other devices through a certain proprietary protocol (e.g., the first communication network). Additionally, although the embodiments discussed herein refer to the database 114 as a singular database, it should be understood that in some embodiments, the database 114 may include more than one database. It should also be noted that, the computing device 112 may be any suitable computing device that includes communication abilities, processing abilities, and the like. For example, the computing device 112 may be any general computing device that may facilitate display of the graphical user interface and submission of one or more user-selected I/O parameters associated with each IED 122, 124, 126. It should be noted that the configuration system 110 may also be any suitable computing device like the computing device 112. As such, the configuration system 110 and/or the computing device 112 may be a general-purpose computer, a mobile computing device, a laptop-computing device, a tablet computing device, a wearable computing device (e.g., a smartwatch), and the like.

The configuration system 110 may receive an indication of user-selected I/O parameters associated with each IED 122, 124, 126 from the computing device 112 via the graphical user interface that the user wants the controller 116 to read as outputs from each IED 122, 124, 126 in the industrial system or write as inputs to each IED 122, 124, 126 in the industrial system. Based on the indication of the user-selected I/O parameters associated with each IED, the configuration system 110 may generate a first data file that defines one or more types of I/O parameter data that may be exchanged between each IED 122, 124, 126 and the controller 116 via the gateway device 120. For example, the first data file may include one or more types of user-selected input parameters that may be transmitted from the controller 116 to each IED 122, 124, 126 via the gateway device 120, one or more types of user-selected output parameters that may be transmitted from each IED 122, 124, 126 to the controller 116 via the gateway device 120, one or more I/O parameter tags to be stored in the controller 116 that correspond to the user-selected I/O parameters, and one or more conditions that may initiate an I/O parameter data transmission between the gateway device 120 and the controller 116.

The configuration system 110 may also generate a second data file that contains device mapping data defining how data is exchanged between the gateway device 120 and each IED 122, 124, 126 in the industrial system. For example, the second data file may include a number of connections (e.g., Common Industrial Protocol (CIP) connections) associated with the gateway device 120, an I/O parameter type of each connection (e.g., input or output), each type of I/O parameter data transmitted between the gateway device 120 and each IED 122, 124, 126, a frequency of parameter data transmission for each user-selected I/O parameter between each IED 122, 124, 126 and the gateway device 120, or the like. The second data file may also define how the I/O parameter data received from each IED 122, 124, 126 is mapped to each corresponding I/O parameter tag stored in the controller 116.

After generating the first data file and the second data file, the configuration system 110 may then transmit the first data file and the second data file to the controller 116 via the first communication network 118. Upon receiving the first data file, the controller 116 may be automatically configured based on the first data file. For example, the controller 116 may store the I/O parameter tags defined in the first data file in the controller 116. The controller 116 may also push the second data file to the gateway device 120 along a backplane 130 of a chassis system. For example, after a power cycle of the controller 116 and the gateway device 120, the controller 116 may transmit the second data file to the gateway device 120. The gateway device 120 may then be automatically configured based on the second data file. The gateway device 120 may associate one or more connections of the gateway device 120 with a particular input parameter associated with an IED 122, 124, 126 or a particular output parameter associated with an IED 122, 124, 126 based on the device mapping data in the second data file. The gateway device 120 may also set a value for an update rate associated with each connection of the gateway device 120 based on the frequency of parameter data transmission for a corresponding user-selected I/O parameter defined in the second data file. The gateway device 120 may then push the configuration of the gateway device 120 to each IED 122, 124, 126 utilizing the second communication network 128.

In some embodiments, the controller 116 and the gateway device 120 may be a single device. For example, the controller 116 may have the same functions as the gateway device 120 or similar functions to the gateway device 120, or the gateway device 120 may have the same function as the controller 116 or similar functions to the controller 116. In one embodiment, the controller 116 may be configured to store the I/O parameter tags defined in the first data file, associate one or more connections of the controller with a particular input parameter associated with an IED 122, 124, 126 or a particular output parameter associated with an IED 122, 124, 126, set a value for an update rate associated with each connection of the controller based on the frequency of parameter data transmission for a corresponding user-selected I/O parameter defined in the second data file, push the configuration of the controller 116 to each IED 122, 124, 126 utilizing the second communication network 128, or a combination thereof, upon receiving the first data file and the second data file. In some embodiments, the first data file and the second data file may be a single data file that is used to configure the controller 116 or the gateway device 120.

Figure 2:
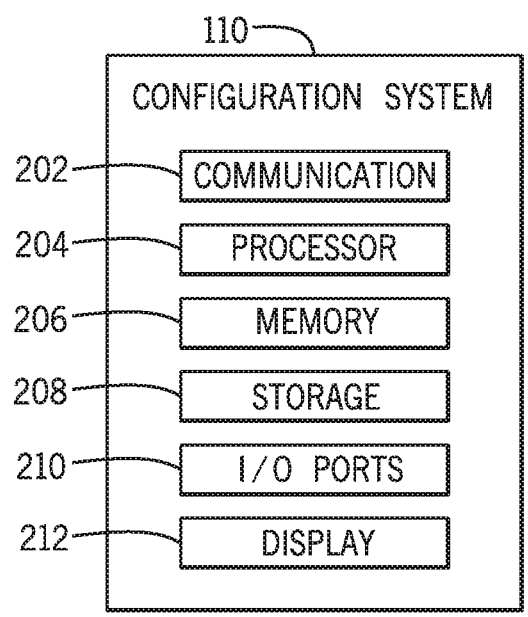
FIG. 2 illustrates a block diagram of a configuration system employed by the industrial communication system of FIG. 1, in accordance with embodiments described herein.

To perform some of the actions set forth above, the configuration system 110 may include certain embodiments to facilitate these actions. FIG. 2 is a block diagram of example components within the configuration system 110. For example, the configuration system 110 may include a communication component 202, a processor 204, a memory 206, a storage 208, input/output (I/O) ports 210, a display 212, and the like. The communication component 202 may be a wireless or wired communication component that may facilitate communication between the computing device(s) 112, the database 114, the controller 116, and the like. Additionally, the communication component 202 may facilitate data transfer to and from the configuration system 110, such that the configuration system 110 may receive information associated with each IED in a particular industrial system from the database(s) 114 and an indication of user-selected I/O parameters from the computing device 130.

The processor 204 may be any type of computer processor or microprocessor capable of executing computer-executable code. The processor 204 may also include multiple processors that may perform the operations described below. The memory 206 and the storage 208 may be any suitable articles of manufacture that can serve as media to store processor-executable code, data, or the like. These articles of manufacture may represent computer-readable media (e.g., any suitable form of memory or storage) that may store the processor-executable code used by the processor 204 to perform the presently disclosed techniques. The memory 206 and the storage 208 may also be used to store data, consumer models, various other software applications, and the like. The memory 206 and the storage 208 may represent non-transitory computer-readable media (e.g., any suitable form of memory or storage) that may store the processor-executable code used by the processor 204 to perform various techniques described herein. It should be noted that non-transitory merely indicates that the media is tangible and not a signal.

The I/O ports 210 may be interfaces that couple to other peripheral components, such as input devices (e.g., keyboard, mouse), sensors, I/O modules, and the like. The display 212 may operate to depict visualizations associated with software or executable code being processed by the processor 204. In one embodiment, the display 212 may be a touch display capable of receiving inputs from a user of the configuration system 110. The display 212 may be any suitable type of display, such as a liquid crystal display (LCD), plasma display, or an organic light emitting diode (OLED) display, for example. Additionally, in one embodiment, the display 212 may be provided in conjunction with a touch-sensitive mechanism (e.g., a touch screen) that may function as part of a control interface for the configuration system 110.

It should be noted that the components described above with regard to the configuration system 110 are exemplary components and the automatic configuration system 110 may include additional or fewer components as shown. Additionally, it should be noted that the computing device 112, the controller 116, and the gateway device 120 may also include similar components as described as part of the configuration system 110.

Figure 3:
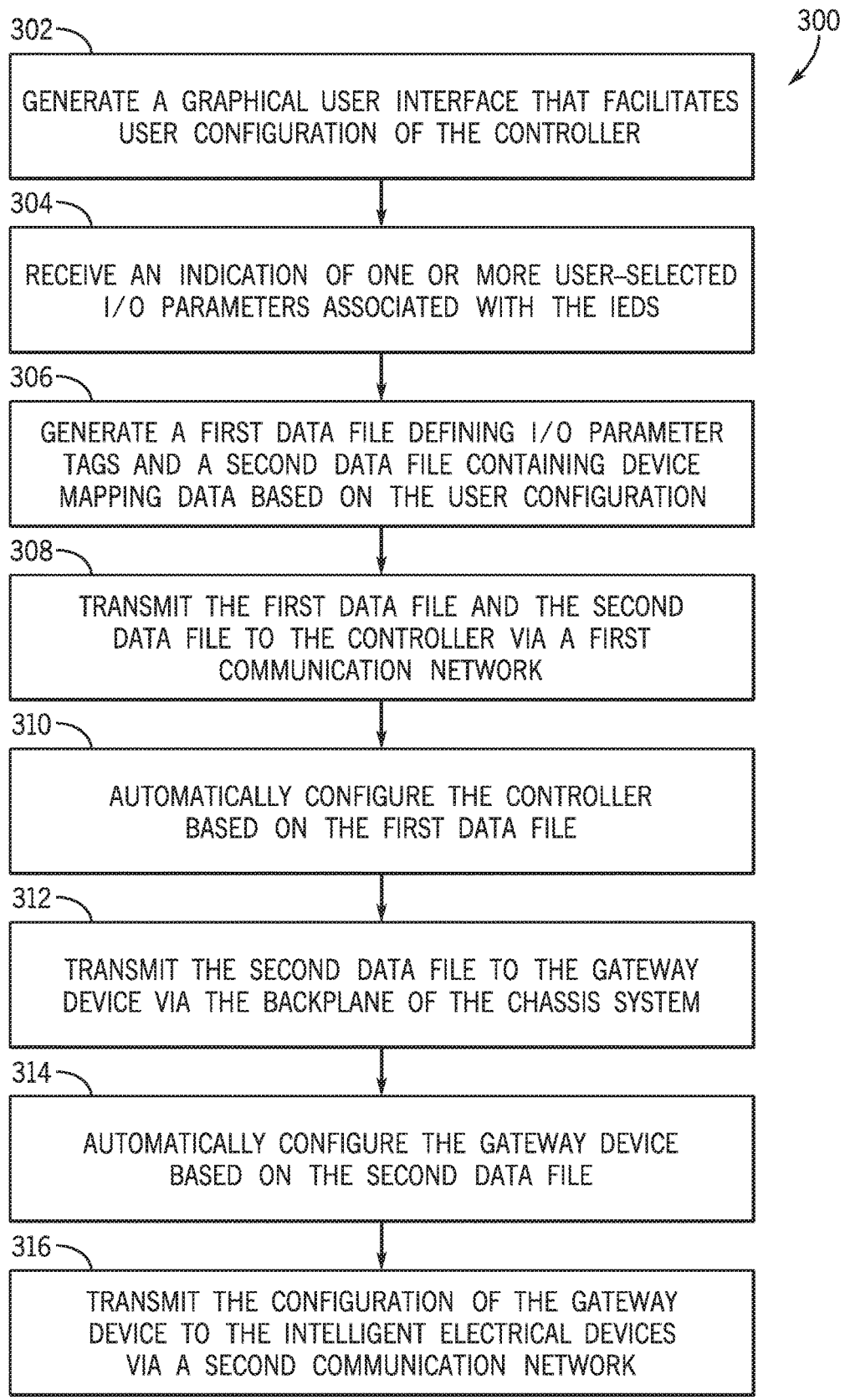
FIG. 3 illustrates a flow chart of a method for automatically configuring a controller for use and communication with intelligent electrical devices (IEDs) utilizing a different communication protocol in an industrial system, in accordance with embodiments described herein.

With the foregoing in mind, FIG. 3 illustrates a flow chart of a method 300 for automatically configuring the controller 116 for communication with one or more IEDs 122, 124, 126 that utilize a different communication protocol than the controller 116. Generally, the method 300 may include generating a graphical user interface for display on a computing device 112 accessibly by a user that facilitates user configuration of the controller 116, Although the following description of the method 300 is described in a particular order, it should be noted that the method 300 is not limited to the depicted order, and instead, the method 300 may be performed in any suitable order. Moreover, although the method 300 is described as being performed by the configuration system 110, it should be noted that it may be performed by any suitable computing device.

As mentioned above, the method 300 may include the configuration system 110 generating a graphical user interface that facilitates configuration of the controller 116 for communication with one or more IEDs 122, 124, 126 in the industrial system and controlling one or more operations of each IED 122, 124, 126. For example, the graphical user interface may provide the user with a set of I/O parameters associated with each IED 122, 124, 126 in the industrial system. The set of I/O parameters may include a voltage I/O parameter, a current I/O parameter, a power I/O parameter, a power factor I/O parameter, an alarm I/O parameter associated with a trip, an alarm I/O parameter associated with a fault, an alarm I/O parameter associated with a warning, or the like. In certain embodiments, the set of I/O parameters may be grouped as reports.

After the graphical user interface displays the set of I/O parameters associated with each IED 122, 124, 126 in the industrial system, a user may then select a subset of each set of I/O parameters associated with each IED 122, 124, 126 in the graphical user interface that the user wants the controller 116 to read as outputs from each IED 122, 124, 126 or write as inputs to each IED 122, 124, 126. Based on the user-selected I/O parameters associated with each IED 122, 124, 126, the configuration system 110 may generate a first data file that defines one or more types of I/O parameter data that may be exchanged between each IED 122, 124, 126 and the controller 116 via the gateway device 120. The first data file defines the data types and members associated with each parameter of data of an IED 122, 124, 126. The definitions associated with each IED 122, 124, 126 include a fully qualified name (FQN) of each IED 122, 124, 126 and a data path for an instance associated with each IED 122, 124, 126. In this way, the creation of the first data file and subsequent configuration of the controller 116 based on the first data file minimizes manual mapping of the controller 116. The configuration system 110 may then generate a second data file that contains device mapping data defining how data is exchanged between the gateway device 120 and each IED 122, 124, 126. The device mapping data of the second data file provides a schema for the gateway device 120 to exchange data with the controller 116. The second data file also facilitates automatic mapping of each I/O parameter associated with each IED 122, 124, 126 to a corresponding connection of the gateway device 120 that is compatible with the controller 116.

After generating the first data file and the second data file, the configuration system 110 may then transmit the first data file and the second data file to the controller 116. The controller 116 may be automatically configured based on the first data file. For example, the controller 116 may store I/O parameter tags defined in the first data file in the controller 116 after the first data file is read and parsed. The I/O parameter tags may be created by the configuration system 110 during generation of the first data file and placed into frame sized connections. The configuration system 110 may also facilitate detection, instantiation, and implementation of the I/O parameters in the controller 116 based on I/O parameters defined in the first data file. In this way, the controller 116 may read certain types of output parameter data received from each IED 122, 124, 126 via the gateway device 120 and write certain types of input parameter data that each IED 122, 124, 126 may read to perform one or more operations. The controller 116 may also transmit the second data file to the gateway device 120 via the backplane 130 of a chassis system associated with the controller 116 and the gateway device 120.

After receiving the second data file from the controller 116, the gateway device 120 may be automatically configured based on the second data file. For example, the gateway device 120 may associate one or more connections of the gateway device 120 with a particular input parameter associated with an IED 122, 124, 126 or a particular output parameter associated with an IED 122, 124, 126 based on the device mapping data in the second data file. The gateway device 120 may also set an update rate value for each connection of the gateway device 120 based on a frequency of parameter data transmission for a corresponding user-selected I/O parameter defined in the second data file. As such, the configuration system 110 may automatically configure the controller 116 for communication with each IED 122, 124, 126 in the industrial system that utilizes a different communication protocol than the controller 116 in the industrial system and controlling one or more operations of each IED 122, 124, 126. In this way, the configuration system 110 may facilitate a reduction in the amount of programming a user manually performs to configure the controller 116 for use and communication with IEDs 122, 124, 126 utilizing a different communication protocol than the controller 116 in the industrial system.

For example, manual configuration of the controller 116 by a user may include the user manually determining each I/O parameter, or the like, associated with an IED 122, 124, 126 that the IED 122, 124, 126 may send and receive via a communication network. The user may then manually determine each I/O parameter, or the like, that may be exchanged between each IED 122, 124, 126 and the controller 116. After such a determination, the user may manually create one or more schemas or one or more data types for each I/O parameter, or the like, that may be received from each IED 122, 124, 126. The user may then map each I/O parameter, or the like, that may be received from each IED 122, 124, 126 as an array of generic information in 500-byte input frame sizes. After mapping each I/O parameter, the user may write application code to deconstruct each 500-byte frame size connection and map each deconstructed 500-byte frame size connection to a unique data structure defined by the manually created schema.

Keeping this in mind and referring to FIG. 3, at block 302, the configuration system 110 may generate a graphical user interface for display on one or more computing device(s) 112 that facilitates configuration of the controller 116 for communication with one or more IEDs 122, 124, 126 in an industrial system and for controlling one or more operations of the IEDs 122, 124, 126 in the industrial system. For example, the IEDs 122, 124, 126 may include meter relays, motor relays, transformers, generators, circuit breakers, power monitors, switchgears, or the like. To generate the graphical user interface for display by the computing device(s) 112, the configuration system 110 may access a database 114 for information associated with each IED 122, 124, 126 in the industrial system. For example, the information associated with each IED 122, 124, 126 in the industrial system may include an identifier (e.g., identification information) associated with each IED 122, 124, 126, a product type of each IED 122, 124, 126, a set of I/O parameters associated with each type of IED 122, 124, 126, or the like. In some embodiments, the database 114 may index the information associated with each IED in a particular industrial system based on an identifier associated with the industrial system. In some embodiments, the configuration system 110 may receive the identifier associated with a particular industrial system from a user via the computing device(s) 112. In this way, the configuration system 110 may send a request for the information associated with each IED 122, 124, 126 in the industrial system with the identifier associated with the industrial system to the database 114. After sending the request to the database 114, the configuration system 110 may access the requested information associated with each IED 122, 124, 126 in the particular industrial system from computing device(s) based on the identifier associated with the industrial system. After receiving the information associated with each IED 122, 124, 126 in the industrial system from the database 114, the configuration system 110 may generate the graphical user interface that displays each set of I/O parameters associated with each IED 122, 124, 126 in the industrial system and transmit the graphical user interface to the computing device 112 for display.

At block 304, the configuration system 110 may receive an indication of one or more sets of I/O parameters associated with the IEDs 122, 124, 126 in the industrial system from the computing device(s) 112. For example, the user may select a subset of I/O parameters from one or more sets of I/O parameters associated with the IEDs 122, 124, 126 in the graphical user interface that the user wants the controller 116 to read as outputs from each IED 122, 124, 126 and write as inputs to each IED 122, 124, 126. After receiving the indication of the one or more subsets of user-selected I/O parameters from the computing device(s) 112, at block 306, the configuration system 110 may generate a first data file (e.g., an XML file) having a specific schema that defines one or more types of I/O parameter data that may be exchanged between each IED 122, 124, 126 and the controller 116 via the gateway device 120. For example, the first data file may include one or more types of user-selected input parameters that may be transmitted to each IED 122, 124, 126, one or more types of user-selected output parameters that may be received from each IED 122, 124, 126, one or more I/O parameter tags to be stored in the controller 116 that correspond to the user-selected I/O parameters, and one or more conditions that initiate an I/O parameter data transmission between the gateway device 120 and the controller 116, such as a particular frequency of I/O parameter data transmission, in response to a change of state of the IED 122, 124, 126, or the like. At the same time or nearly the same time, the configuration system 110 may also generate a second data file (e.g., an XML file) having a specific schema that contains device mapping data defining how data is exchanged between the gateway device 120 and each IED 122, 124, 126 based on the user-selected I/O parameters. For example, the second data file may include a number of connections (e.g., Common Industrial (CIP) connections) associated with the gateway device 120, an I/O parameter type associated with each connection (e.g., input or output), each type of user-selected I/O parameter transmitted between the gateway device 120 and each IED device 122, 124, 126, a frequency or a condition associated with parameter data transmission for each user-selected I/O parameter between each IED 122, 124, 126 and the gateway device 120, and the like. The second data file may also define how the I/O parameter data received from each IED device 122, 124, 126 is mapped to each corresponding I/O parameter tag stored in the controller.

Although the first data file and the second data file are described above as being generated at the same time or nearly the same time, in certain embodiments, the first data file and the second data file may be generated sequentially. That is, the configuration system 110 may generate the first data file and then generate the second data file, or the configuration system 110 may generate the second data file and then the first data file. Additionally, it should be understood that in certain embodiments, the first data file and the second data file may be generated as a single data file that defines the types of I/O parameter data that may be exchanged between each IED 122, 124, 126 and the controller 116 via the gateway device 120 and contains the device mapping data that defines how data is exchanged between the gateway device 120 and each IED 122, 124, 126.

After generating the first data file and the second data file, at block 308, the configuration system 110 may transmit the first data file and the second data file to the controller 116 via the first communication network 118. In certain embodiments, the first communication network 118 may include any wired or wireless network that may be implemented as a local area network (LAN), a wide area network (WAN), and the like, or any industrial communication network protocol, such as EtherNet/IP, ControlNet, DeviceNet, and the like. After receiving the first data file, at block 310, the controller 116 may be automatically configured based on the first data file. For example, the controller 116 may store the I/O parameter tags defined in the first data file in the controller 116.

At block 312, the controller 116 may also push the second data file to the gateway device 120 along a backplane 130 of a chassis system containing the controller 116 and the gateway device 120. For example, after a power cycle of the controller 116 and the gateway device 120 (i.e., the controller 116 and the gateway device 120 are restarted), the controller 116 may transmit the second data file to the gateway device 120. At block 314, the gateway device 120 may then be automatically configured based on the second data file. For example, the gateway device 120 may associate one or more connections of the gateway device 120 with a particular input parameter associated with an IED 122, 124, 126 or a particular output parameter associated with an IED 122, 124, 126 based on the device mapping data in the second data file. The gateway device 120 may also set a value for an update rate associated with each connection of the gateway device 120 based on the frequency of parameter data transmission for a corresponding user-selected I/O parameter defined in the second data file. At block 316, the gateway device 120 may then push the configuration of the gateway device 120 to each IED 122, 124, 126 utilizing the second communication network 128. In certain embodiments, the second communication network 128 may include an unmodified Ethernet network based on the IEC 61850 standard.

As such, the configuration system 110 may automatically configure the controller for communication with each IED 122, 124, 126 utilizing a different communication network (e.g., the second communication network 128) than the controller (e.g., the first communication network 118). For example, the first communication network 118 may include an automation network, such as Common Industrial Protocol (CIP), and the second communication network 128 may include an electrical network, such as IEC 61850. In this way, the configuration system 110 may facilitate a reduction in the amount of programming a user manually performs to configure the controller 116 for use and communication with the IEDs 122, 124, 126 in the industrial system. Additionally, after configuration of the controller 116 and the gateway device 120, the controller 116 may read output parameter data from one or more IEDs 122, 124, 126 in the industrial system (e.g., via the gateway device 120) and store the parameter data in a memory accessible by the controller 116 (e.g., the database 114). The controller 116 may also transmit input parameter data to one or more IEDs 122, 124, 126 in the industrial system (e.g., via the gateway device 120) to control one or more operations of the IEDs 122, 124, 126. For example, the controller may control one or more operations of the IEDs 122, 124, 126 associated with load shedding, load management, opening circuit breakers, closing circuit breakers, or the like.

Referring back to block 302, in certain embodiments, the graphical user interface may also provide various options associated with each IED 122, 124, 126, the controller 116, and the gateway device 120 to the user. For example, the graphical user interface may provide a first option to enable or disable network redundancy for the first communication network, the second communication network, or both. For example, the first option may enable implementation of a parallel redundancy protocol (PRP) that provides failover against failure of one or more network components. The graphical user interface may also provide a second option to enable or disable time synchronization for devices on the first communication network, the second communication network, or both. For example, the second option may enable implementation of a precision time protocol (PTP) to synchronize clocks associated with each device on the first communication network, the second communication network, or both. Additionally, the graphical user interface may provide the user with a diagnostic view associated with the controller 116, the gateway device 120, one or more of the IEDs 122, 124, 126, or a combination thereof. For example, the diagnostic view may provide I/O parameter data that may be read by each device, I/O parameter data that may be written by each device, a relay status associated with each device, or a combination thereof. Further, the graphical user interface may provide a third option to embed a project name into the first data file, the second data file, or both. At block 304, the configuration system 110 may receive one or more user inputs associated with the first option, the second option, the third option, or a combination thereof, from the computing device 112, and, at block 306, the configuration system 110 may generate the first data file, the second data file, or both, to include the indications of the first option, the second option, the third option, or both. In this way, at blocks 310-316, the controller 116, the gateway device 120, the IEDs 122, 124, 126 may be configured to implement the selected options (e.g., network redundancy or time synchronization) based on the first data file, the second data file, or both.

With the foregoing in mind, FIG. 4 illustrates an exemplary dialog window 400 of the graphical user interface that facilitates configuration of the controller 116 for communication with the IEDs 122, 124, 126 in the industrial system and for controlling one or more operations of the IEDs 122, 124, 126 in the industrial system. The configuration system 110 may generate the graphical user interface for display on the computing device(s) 112. For example, the dialog window 400 of the graphical user interface may be presented to the user within a software application executing on the computing device(s) 112, a web browser executing on the computing device(s), an application portal accessed via the computing device(s), or the like. The user may select a graphical icon within the launch window to launch a configuration window of the graphical user interface or otherwise provide input indicative of the selection via the computing device(s).

After the user selects the graphical icon to launch the configuration window of the graphical user interface, the configuration system may transmit an update to the graphical user interface to display the configuration window of the graphical user interface. FIG. 5 illustrates an exemplary configuration window 500 of the graphical user interface that may be presented to the user via the computing device(s) 112. For example, the configuration window 500 of the graphical user interface may display each set of I/O parameters associated with each IED 122, 124, 126 in the industrial system. As described above, to generate the configuration window 500 of the graphical user interface for display by the computing device(s) 112, the configuration system 110 may access a database 114 for information associated with each IED 122, 124, 126 in the industrial system. For example, the information associated with each IED 122, 124, 126 in the industrial system may include an identifier (e.g., identification information) associated with each IED 122, 124, 126, a product type of each IED 122, 124, 126, a set of I/O parameters associated with each type of IED, or the like. The configuration window 500 of the graphical user interface may display the identifier associated with each IED 122, 124, 126, the product type of each IED 122, 124, 126, the set of I/O parameters associated with each type of IED 122, 124, 126, or the like.

After the configuration window 500 of the graphical user interface is displayed to the user via the computing device(s), the configuration system 110 may receive an indication of one or more sets of I/O parameters associated with the IEDs 122, 124, 126 in the industrial system from the computing device(s) 112. For example, the user may select a subset of I/O parameters from one or more sets of I/O parameters associated with the IEDs 122, 124, 126 in the configuration window 500 of the graphical user interface that the user wants the controller 116 to read as outputs from each IED 122, 124, 126 and write as inputs to each IED 122, 124, 126. After receiving the indication of the one or more subsets of user-selected I/O parameters from the computing device(s) 112, the configuration system 110 may generate the first data file that defines the types of I/O parameter data that may be exchanged between each IED 122, 124, 126 and the controller 116 via the gateway device 120. At the same time or nearly the same time, the configuration system 110 may also generate the second data file that contains device mapping data defining how data is exchanged between the gateway device 120 and each IED 122, 124, 126 based on the user-selected I/O parameters. After the first data file and the second data file are generated, the configuration system 110 may transmit the first data file and the second data file to the controller 116 via the first communication network 118.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
a controller configured to communicate via a first communication network in an industrial system;

one or more electrical devices configured to communicate via a second communication network in the industrial system;

one or more processors; and a memory, accessible by the one or more processors, storing instructions, that when executed by the one or more processors, cause the one or more processors to:

receive a first data file comprising one or more respective input/output (I/O) parameters associated with the one or more electrical devices in the industrial system, wherein the first data file is dynamically generated via a computing device based on user input indicative of each electrical device of the one or more electrical devices and the one or more respective I/O parameters associated with the one or more electrical devices;

receive a second data file comprising the one or more respective I/O parameters associated with the one or more electrical devices, a respective frequency or a respective condition associated with data transmission for each electrical device of the one or more electrical devices, and a mapping between respective I/O data received from the one or more electrical devices and one or more corresponding I/O parameter tags, wherein the second data file is dynamically generated via the computing device based on the user input and additional user input indicative of the respective frequency or the respective condition; and transmit the first data file and the second data file to the controller, wherein the controller is automatically configured to communicate with each electrical device of the one or more electrical devices based on at least the first data file after receiving the first data file and the second data file.

2. The system of claim 1, wherein the controller is automatically configured to read data associated with one or more output parameters of the one or more respective I/O parameters from each electrical device of the one or more electrical devices and write data associated with one or more input parameters of the one or more respective I/O parameters to each electrical device of the one or more electrical devices.

3. The system of claim 1, wherein the controller is automatically configured to control one or more operations of each electrical device of the one or more electrical devices based on the first data file.

4. The system of claim 1, wherein the controller is configured to transmit the second data file to a gateway device communicatively coupled to the controller, wherein the gateway device is automatically configured based on the second data file.

5. The system of claim 4, wherein the controller and the gateway device are configured to communicate via a backplane of a chassis system.

6. The system of claim 4, wherein the gateway device is automatically configured to associate one or more connections of the gateway device with a first input parameter of the one or more respective I/O parameters associated with the one or more electrical devices or a first output parameter of the one or more respective I/O parameters associated with the one or more electrical devices based on the second data file.

7. The system of claim 6, wherein the gateway device is automatically configured to associate a set of respective data transmission rates for the one or more connections of the gateway device based on the respective frequency or the respective condition.

8. The system of claim 4, wherein the gateway device is configured to transmit a configuration of the gateway device to each electrical device of the one or more electrical devices via the second communication network.

9. The system of claim 1, wherein the first data file comprises the one or more respective I/O parameters and the one or more corresponding I/O parameter tags, and wherein the controller is automatically configured to store the one or more corresponding I/O parameter tags in a memory accessible by the controller.

10. The system of claim 1, wherein the second communication network is based on the International Electrotechnical Commission (IEC) 61850 standard.

11. A method, comprising:

receiving, by a computing device in an industrial system, a first data file comprising one or more respective input/output (I/O) parameters associated with one or more electrical devices in the industrial system, wherein the first data file is dynamically generated via a second computing device based on user input indicative of each electrical device of the one or more electrical devices and the one or more respective I/O parameters associated with the one or more electrical devices;

receiving, by the computing device, a second data file comprising the one or more respective I/O parameters associated with the one or more electrical devices, a respective frequency or a respective condition associated with data transmission for each electrical device of the one or more electrical devices, and a mapping between respective I/O data received from the one or more electrical devices and one or more corresponding I/O parameter tags, wherein the second data file is dynamically generated via the second computing device based on the user input and additional user input indicative of the respective frequency or the respective condition, wherein the one or more electrical devices are configured to communicate via a first communication network based on the International Electrotechnical Commission (IEC) 61850 standard and controller is configured to communicate via a second communication network different than the first communication network;

transmitting, by the computing device, the first data file and the second data file to the controller in the industrial system, wherein the controller is automatically configured to control one or more operations of each electrical device of the one or more electrical devices based on the first data file; and transmitting, via the controller, the second data file to a gateway device communicatively coupled to the controller along a backplane of a chassis system, wherein the gateway device is automatically configured based on the second data file.

12. The method of claim 11, wherein the controller is automatically configured to read data associated with one or more output parameters of the one or more respective I/O parameters from each electrical device of the one or more electrical devices and write data associated with one or more input parameters of the one or more respective I/O parameters to each electrical device of the one or more electrical devices.

13. The method of claim 11, wherein the gateway device is automatically configured to associate one or more connections of the gateway device with a particular input parameter of the one or more respective I/O parameters associated with the one or more electrical devices or a particular output parameter of the one or more respective I/O parameters associated with the one or more electrical devices based on the second data file.

14. The method of claim 11, comprising transmitting, via the gateway device, a configuration of the gateway device to each electrical device of the one or more electrical devices via the first communication network.

15. A non-transitory, computer-readable medium, comprising instructions that when executed by one or more processors, cause the one or more processors to perform operations comprising:

receiving a first data file comprising one or more respective input/output (I/O) parameters associated with one or more electrical devices in an industrial system, wherein the first data file is dynamically generated via a computing device based on user input indicative of each electrical device of the one or more electrical devices and the one or more respective I/O parameters associated with the one or more electrical devices, wherein the one or more electrical devices are configured to communicate via a first communication network based on the International Electrotechnical Commission (IEC) 61850 standard;

receiving a second data file comprising the one or more respective I/O parameters associated with the one or more electrical devices, a respective frequency or a respective condition associated with data transmission for each electrical device of the one or more electrical devices, and a mapping between respective I/O data received from the one or more electrical devices and one or more corresponding I/O parameter tags, wherein the second data file is dynamically generated via the computing device based on the user input and additional user input indicative of the respective frequency or the respective condition; and transmitting the first data file and the second data file to a controller, wherein the controller is configured to communicate via a second communication network different from the first communication network, and wherein the controller is automatically configured to control one or more operations of each electrical device of the one or more electrical devices based on the first data file.

16. The non-transitory, computer-readable medium of claim 15, wherein the controller is automatically configured to read data associated with one or more output parameters of the one or more respective I/O parameters from each electrical device of the one or more electrical devices and write data associated with one or more input parameters of the one or more respective I/O parameters to each electrical device of the one or more electrical devices.

17. The non-transitory, computer-readable medium of claim 15, wherein the controller is configured to transmit the second data file to a gateway device communicatively coupled to the controller along a backplane of a chassis system, wherein the gateway device is automatically configured based on the second data file.

18. The non-transitory, computer-readable medium of claim 17, wherein the gateway device is automatically configured to associate one or more connections of the gateway device with a particular input parameter of the one or more respective I/O parameters associated with the one or more electrical devices or a particular output parameter of the one or more respective I/O parameters associated with the one or more electrical devices based on the second data file.

19. The non-transitory, computer-readable medium of claim 17, wherein the gateway device is automatically configured to associate a set of respective data transmission rates for one or more connections of the gateway device based on the second data file.

20. The non-transitory, computer-readable medium of claim 17, wherein the operations comprise transmitting, via the gateway device, a configuration of the gateway device to each electrical device of the one or more electrical devices via the first communication network.

\* \* \* \* \*